(12) United States Patent
Khorsandi et al.

(10) Patent No.: US 10,579,880 B2
(45) Date of Patent: Mar. 3, 2020

(54) REAL-TIME OBJECT RE-IDENTIFICATION IN A MULTI-CAMERA SYSTEM USING EDGE COMPUTING

(71) Applicant: KONICA MINOLTA LABORATORY U.S.A., INC., San Mateo, CA (US)

(72) Inventors: Rahman Khorsandi, Foster City, CA (US); Jun Amano, Foster City, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 233 days.

(21) Appl. No.: 15/693,339

(22) Filed: Aug. 31, 2017

(65) Prior Publication Data

US 2019/0065858 A1     Feb. 28, 2019

(51) Int. Cl.
*G06K 9/00* (2006.01)
*G06K 9/62* (2006.01)
(Continued)

(52) U.S. Cl.
CPC ......... *G06K 9/00771* (2013.01); *G06K 9/522* (2013.01); *G06K 9/6203* (2013.01);
(Continued)

(58) Field of Classification Search
None
See application file for complete search history.

(56) References Cited

U.S. PATENT DOCUMENTS 5,878,157 A * 3/1999 Mukohzaka ....... G06K 9/00087
                                                              382/124
7,092,548 B2   8/2006 Laumeyer et al.
(Continued)

FOREIGN PATENT DOCUMENTS

WO    WO-2007136332 A1 * 11/2007 ....... H06K 9/000369
WO          2017002118 A       1/2017

OTHER PUBLICATIONS

Farenzena et al. "Person re-identification by symmetry-driven accumulation of local features." Computer Vision and Pattern Recognition (CVPR), 2010 IEEE Conference on. IEEE, 2010.
(Continued)

*Primary Examiner* — Dave Czekaj
*Assistant Examiner* — Shanika M Brumfield
(74) *Attorney, Agent, or Firm* — Chen Yoshimura LLP

(57) ABSTRACT

A video surveillance system with real-time object re-identification capabilities, which employs an object re-identification algorithm and an edge computing architecture. An operator monitors video images from the multiple cameras, and when a target object is observed, a target image containing the object is transmitted to all video cameras for object re-identification. Each video camera has dedicated processing circuitry that performs an object re-identification algorithm to identify the target in video images captured by that camera in real time. The algorithm calculates a frequency domain similarity measure between the target image and test images captured by the camera. The similarity measure in the frequency domain is calculated as a dot product of the 1D discrete Fourier transforms of the target image data and of the test image data. The multiple cameras also transmit object re-identification results to each other to achieve more efficient and intelligent object re-identification.

8 Claims, 3 Drawing Sheets

(51) Int. Cl.
*H04N 7/18* (2006.01)
*G06K 9/52* (2006.01)
*G08B 13/196* (2006.01)

(52) U.S. Cl.
CPC ......... *G06K 9/6215* (2013.01); *G06K 9/6232* (2013.01); *H04N 7/181* (2013.01); *G06K 9/00979* (2013.01); *G08B 13/19645* (2013.01)

(56) References Cited

U.S. PATENT DOCUMENTS

| | | | | |
|---|---|---|---|---|
| 7,391,907 | B1 * | 6/2008 | Venetianer | G06K 9/00771 382/103 |
| 7,450,735 | B1 * | 11/2008 | Shah | G06T 7/292 348/143 |
| 7,634,139 | B2 * | 12/2009 | Yang | G06K 9/6202 341/105 |
| 8,605,155 | B2 * | 12/2013 | Kelly, III | G06K 9/00771 348/143 |
| 9,542,733 | B2 * | 1/2017 | Nakamura | G06T 5/007 |
| 2008/0243342 | A1 * | 10/2008 | Breed | B60R 21/0132 701/45 |
| 2010/0205177 | A1 * | 8/2010 | Sato | G06K 9/00281 707/737 |
| 2011/0235910 | A1 * | 9/2011 | Soceanu | G06K 9/00295 382/173 |
| 2014/0098221 | A1 * | 4/2014 | Brown | G06K 9/00771 348/135 |
| 2016/0180196 | A1 * | 6/2016 | Taylor | G06K 9/6215 382/103 |
| 2017/0091561 | A1 * | 3/2017 | Pham | G06K 9/00288 |
| 2017/0200051 | A1 * | 7/2017 | Brown | G06K 9/00771 |
| 2018/0286081 | A1 * | 10/2018 | Koperski | G06K 9/00771 |

OTHER PUBLICATIONS

Hirzer et al. "Person re-identification by descriptive and discriminative classification." Scandinavian conference on Image analysis. Springer, Berlin, Heidelberg, 2011.

* cited by examiner

REAL-TIME OBJECT RE-IDENTIFICATION IN A MULTI-CAMERA SYSTEM USING EDGE COMPUTING

BACKGROUND OF THE INVENTION

Field of the Invention

This invention relates to object re-identification in a multi-camera system, and in particular, it relates to real-time object re-identification in a multi-camera system that employs an edge computing architecture.

Description of Related Art

A video surveillance system often includes multiple video cameras installed at multiple different locations in an open or enclosed space such as stores, buildings, playing fields, streets, and so on. Such a system can include tens or hundreds of cameras. In video surveillance systems, automatic object re-identification is one of the most important components for safety and surveillance. When a target object (include person) is identified, e.g. by a human operator, in a frame captured by one camera, the goal is to automatically find the same object in frames captured by other cameras. Real-time object re-identification seeks to perform such automatic re-identification in real time, i.e., as subsequent frames are captured by other cameras, the object is identified in these frames (if it is present) in real time. "Real time" requires the data processing for re-identifying the object be as fast as the image frames are captured. For example, if a video is taken at 30 frame per second, i.e. a new frame is captured every 33 ms, and if every frame is processed for object re-identification, then "real time" requires that the current frame be processed in less than 33 ms, i.e. before the next frame is taken. Real-time re-identification is important and often critical to prevention of crime or damages.

Object re-identification is a challenging problem, and many factors affect the performance of algorithms, such as illumination variation, background clutter, changes of perspective and scale, change of pose, etc. Currently available technologies are often too slow and computationally too expensive to re-identify an object across hundreds of cameras in real time. Some known methods uses feature extraction from the object, such as HOG, Wavelet or Gabor. After extracting features, a classifier or identifier is used to recognize the object, such as SVM, KNN or regression. This procedure tends to be very slow and time consuming and requires large storage and many calculations.

SUMMARY

There is a need for efficient video image based methods for object re-identification across multiple camera views. There is also a need for video surveillance systems that use high quality but inexpensive video cameras that can perform real-time automated video image analysis for object re-identification.

Embodiments of the present invention provide a system for automatic and accurate real-time object re-identification in a multi-camera surveillance system. An image of an object, which may be an image patch cropped from either an image taken by one of the cameras or some other sample image, is presented to the system. Then, the multi-camera system automatically and in real-time finds the object in the multiple cameras using an image data processing algorithm that calculates correlation similarity in the spatial frequency domain. The system employs an edge-based processing architecture, where the image data processing is performed on each camera which has dedicated processing hardware to re-identify the object from images taken by that camera, and each camera sends the re-identification result to other cameras and to a monitoring device for display to an operator.

In embodiments of the present invention, object re-identification by each camera is performed in Fourier domain using correlation similarity which reduces computations and storage while maintaining a high accuracy and real-time performance.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve the above objects, the present invention provides a video surveillance system which includes: a plurality of video cameras located at different physical locations, each video camera including: an image capture device; dedicated image data processing circuitry; a memory; and a communication interface device; a monitoring device connected to the plurality of video cameras via a communication network; wherein the dedicated image data processing circuitry of each video camera is configured to perform an object re-identification process which includes: receiving, from the monitoring device via the communication interface device, target image data x representing an image containing a target object; obtaining test image data y from a frame of image captured by the image capture device of the video camera; computing a one-dimensional discrete Fourier transform $\hat{x}$ of the target image data x; computing a one-dimensional discrete Fourier transform $\hat{y}$ of the test image data y; computing a spatial frequency domain similarity measure S between the target image data x and the test image data y which is proportional to a dot product of the discrete Fourier transform $\hat{x}$ of the target image data x and the discrete Fourier transform $\hat{y}$ of the test image data y; when the spatial frequency domain similarity measure S is greater than a predetermined threshold value, determining that the target object has been re-identified; and when the object is re-identified, transmitting, via the communication interface device, an object re-identification result to the monitoring device.

In another aspect, the present invention provides a method implemented in a video surveillance system, which includes: capturing video image data by each of a plurality of video cameras located at different physical locations; transmitting the video image data from each video camera to a monitoring device; at the monitoring device, monitoring the video image data to identify a target object in the video image data from one of the video cameras; generating target image data x representing an image containing the target object using the monitoring device; transmitting the target image data x from the monitoring device to each of the plurality of video cameras; each of the video cameras, using its dedicated image data processing circuitry, performing an object re-identification process which includes: continuing to capture video images; obtaining test image data y from a frame of captured video image; computing a one-dimensional discrete Fourier transform $\hat{x}$ of the target image data x; computing a one-dimensional discrete Fourier transform $\hat{y}$ of the test image data y; computing a spatial frequency domain similarity measure S between the target image data x and the test image data y which is proportional to a dot product of the discrete Fourier transform $\hat{x}$ of the target image data x and the discrete Fourier transform $\hat{y}$ of the test image data y; when the spatial frequency domain similarity measure S is greater than a predetermined threshold value, determining that the target object has been re-identified; and when the object is re-identified, transmitting an object re-identification result to the monitoring device.

In some embodiments, when the object is re-identified by one video camera, it transmits the object re-identification result to at least some other ones of the plurality of video cameras. Further, when a video camera received the object re-identification result from another video camera, it performs the object re-identification process based on the received object re-identification result.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 1:
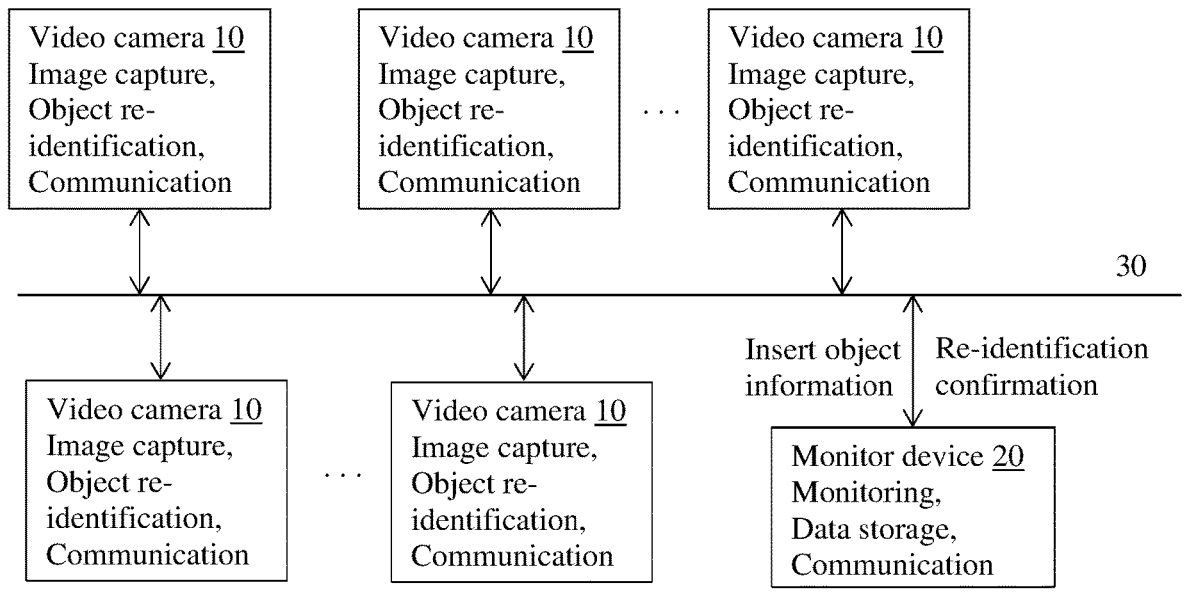
FIGS. 1 and 1A schematically illustrate a video surveillance system including a plurality of cameras in an edge computing based system for object re-identification according to an embodiment of the present invention.

As discussed earlier, one of the most important steps in video analysis is object re-identification. Object re-identification is applicable in automated surveillance for monitoring a scene to find objects or video indexing for automatic annotations and retrieval of the videos from multi-camera system. In a simple definition, object re-identification can be defined as the problem of estimating the location and finding a specific object (target object, which may be manually determined by a user) in a multi-camera system which often have no or little overlap of views among cameras. Object re-identification can be complex and time consuming due to noise, complex object motion, partial occlusion, loss of information in 2D images, and real-time processing requirements.

Embodiments of the present invention provide a video surveillance system with real-time object re-identification capabilities, which employs an object re-identification algorithm and dedicated processing hardware associated with each video camera of the system. The object re-identification algorithm is based on correlation similarity measure in the frequency domain, which can reduce the computing complexity and storage requirement. The system architecture, shown in FIGS. 1 and 1A, employs multiple edge computing cameras 10 to speed up object re-identification and increase its accuracy. The multiple cameras 10 communicate with each other and with a monitoring device 20 by high bandwidth local area network (LAN) 30, such as 100 Gigabit Ethernet. For example, the cameras 10 may transmit video image data it captures to the monitoring device 20, receives commands and data from the monitoring device, and transmits data processing results to the monitoring device and to other cameras.

Each video camera 10, located at a particular physical location, includes an image capture device 11 (which may employ, for example, a CCD device), dedicated data processing circuitry 12, memory 13, and communication interface device 14 for wired communication with each other and the monitoring device 20. The dedicated data processing circuitry 12 may be processor chips, such as image accelerator chip implemented by FPGA (field programmable gate array), ASIC (application specific integrated circuit), or other technologies. The processor chips are implemented with capabilities of real-time object re-identification by the implementing the image similarity analysis algorithm described in more detail below. The video cameras can effectively transfer image data to and from the external memory of the monitoring device and adjacent processor chips in other cameras with the same rate.

The monitoring device 20 includes a display, keyboard and mouse for user interface, and data storage memories for storing a large amount of image data.

Figure 2:
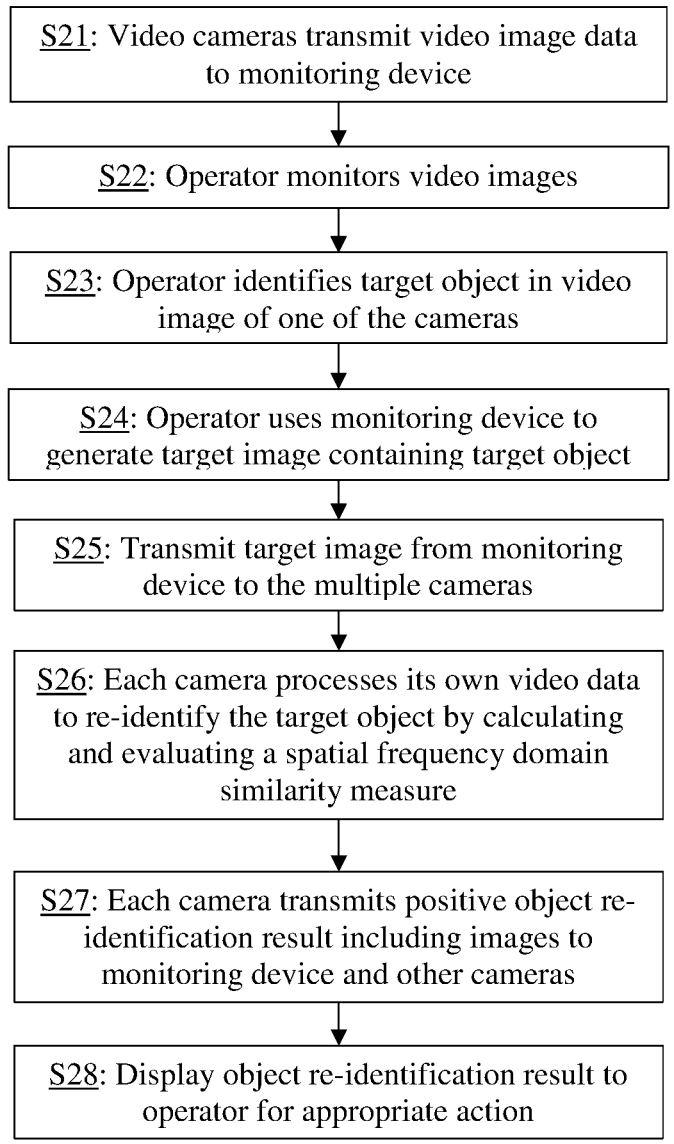
FIGS. 2 and 2A schematically illustrate an object re-identification method implemented in the video surveillance system of FIGS. 1 and 1A.

In operation (see FIG. 2), the multiple video cameras transmit video data they capture to the monitoring device 20 via the network 30 to be displayed (step S21). A human operator operates the monitoring device 20 to monitor images taken by the multiple cameras 10 (step S22). For example, video image data from multiple cameras may be displayed in a grid view on one or more display monitors of the monitoring device 20 for monitoring. When the operator observes a target object in the video images from one of the cameras (step S23), the operator can operate the monitoring device 20 to generate a still image of the target object (step S24), e.g. by cropping an image patch. The monitoring device 20 transmits the image ("target image") to all of the multiple cameras 10 with a request to re-identify the target object (step S25). Each of the camera 10 then performs object re-identification on the video images that are continuously taken by the camera (step S26), and transmits any positive re-identification result to the monitoring device 20 to indicate that the target object is identified in that camera (step S27). The re-identification result preferably includes images of the target object that is identified. Note that a camera 10 does not need to transmit negative re-identification result to the monitoring device 20 if the target object is not re-identified in that camera.

In step S27, a camera that has re-identified the target object may also transmit the re-identification result to other video cameras 10. Each camera that has received positive object re-identification result from other cameras can use that information for image analytics, such as calculating the speed and direction of the target's movement, and can also recognize abnormal movements of the target using knowledge from deep learning. More specifically, the video cameras can use object re-identification information received from each other in several ways.

First, if there is overlap between the fields of view of two cameras, and the first camera has re-identified the object, then the first camera may send the exact location of the object to the second camera, and the second camera can specifically analyze certain image areas based on the object location received from the first camera, and does not have to process the entire video it captures to find the object. Also, a first camera that has re-identified the object can analyze the path and speed of the object, and send that information to nearby cameras even if the other cameras do not have overlap fields of view with the first camera, so that the other camera can more intelligently re-identify the object using that information. It will be more efficient and accurate to use the information received from other cameras for re-identifying the object.

Second, at the beginning of object re-identification, there is only one sample of the object (the one that has been identified by the operator in steps S23 and S24). After the object has been re-identified by some of the cameras, the images from these cameras may often show different poses (or other properties) of the object, and these different poses can be helpful to other cameras to efficiently re-identify the object in their respective fields of view.

The object re-identification result, including images of the re-identified target object and other related information, is displayed to the operator at the monitoring device 20 so that the operator may take appropriate actions (step S28). In step S26, the dedicated processing circuitry of each camera performs re-identification processing by calculating and evaluating a spatial frequency domain similarity measure.

The object re-identification algorithm performed by the data processing circuitry 12 of each camera 10 calculates correlation similarity in the spatial frequency domain.

Correlation is often used to measure the similarity between two signals or images. In the spatial domain, a correlation between two image signals x and y, where $x=(x_1, x_2, \ldots x_n)$ and $y=(y_1, y_2, \ldots y_n)$ respectively represent the pixel values of two images X and Y, where n is the total number of pixels in each image (i.e. if the image has M by N pixels, then n=M*N), can be defined as:

$$r(x, y) = \frac{\frac{1}{n}\Sigma_i x_i y_i - \mu_x \mu_y}{\sigma_x \sigma_y}$$

where $$\mu_x = \frac{1}{n}\Sigma_i x_i \text{ and } \mu_y = \frac{1}{n}\Sigma_i y_i$$

are respectively the means of x and y, and $$\sigma_x = \sqrt{\frac{1}{n}\Sigma_i x_i^2 - \mu_x^2} \text{ and } \sigma_y = \sqrt{\frac{1}{n}\Sigma_i y_i^2 - \mu_y^2}$$

are respectively the uncorrected sample standard variations of x and y. The correlation value r is a number between 0 and 1, where 0 means that two images, x and y, are not similar at all, and 1 means that x and y are the same images. In other words, a higher correlation value indicates that the two images are more similar.

Computing the above correlation in the spatial domain is computationally intensive. Thus, the image similarity analysis algorithm according to embodiments of present invention avoids calculating the correlation in the spatial domain. Rather, the image similarity analysis algorithm calculates a similarity measure in the spatial frequency domain.

More specifically, the algorithm takes advantage of a property that, in object re-identification applications, it is often the case that in the target image (i.e. the image received from the monitoring device 20 that is known to contain the target object) and the test image (i.e. the image taken by the camera 10 that is being analyzed to identify the presence of the target object), the object is mostly shifted in the two images. In such a case, the properties of shifted matrices can be used to design a faster algorithm.

A shifted 2D matrix is a square matrix whose rows are formed by the same 1D vector that is shifted from one row to the next. For example, a shifted matrix A(x) can be constructed from the 1D vector $x=(x_1, x_2, \ldots, x_n)$ as follows:

$$A(x) = \begin{bmatrix} x_1 & x_2 & \ldots & x_n \\ x_n & x_1 & \ldots & x_{n-1} \\ & & \vdots & \\ x_2 & x_3 & \ldots & x_1 \end{bmatrix}$$

It can be shown mathematically that the discrete Fourier transform (DFT) Â of a shifted matrix A can be expressed in a form that involves a diagonal matrix formed by the discrete Fourier transform (DFT) of the 1D vector x, i.e., the DFT Â of the above shifted matrix A can be written as:

$$\widehat{A(x)} = B \, \text{diag}(\hat{x}) B^H$$

where $\text{diag}(\hat{x})$ is a diagonal matrix where the diagonal elements are $\hat{x}$, $\hat{x}$ being the DFT of the 1D vector x, B is a constant unitary matrix that can be calculated (B being independent of x), and $B^H$ is the Hermitian transpose (i.e. the complex conjugate of the transpose) of B.

According to an embodiment of the present invention, a frequency domain similarity measure S of the two image signals x and y is proportional to the product of the two respective discrete Fourier transforms of the corresponding shifted matrix A(x) and A(y), i.e., $S \propto \widehat{A(x)} \, \widehat{A(y)}$. Because B is a unitary matrix, $B^H B = 1$. Therefore, it can be seen that the frequency domain similarity measure S is proportional to the dot product of the DFT of the two image signals, i.e. $S \propto \hat{x} \cdot \hat{y}$.

Figure 2A:
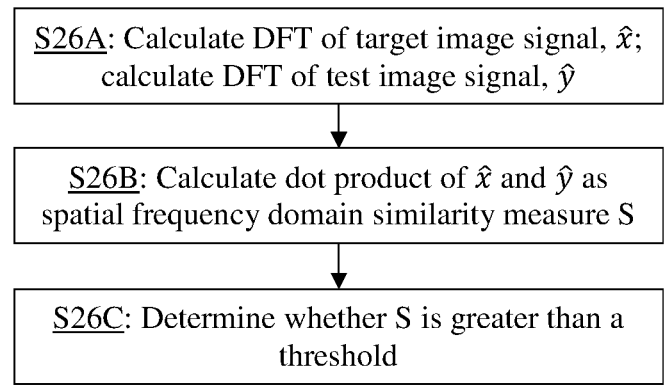

The above discussion explains the mathematical significance of the frequency domain similarity measure S. In actual implementation, to calculate the frequency domain similarity measure S of the two image data x (the target image) and y (the test image), it is not necessary to calculate the shifted matrix A(x) and A(y) and the matrices B and $B^H$. Rather, the frequency domain similarity measure S can be simply calculated as follows (FIG. 2A):

First (step S26A), compute the discrete Fourier transform $\hat{x}$ of the target image data x, i.e., $\hat{x}=(\hat{x}_1, \hat{x}_2, \ldots \hat{x}_n)=\text{DFT}(x)$, and compute the discrete Fourier transform $\hat{y}$ of the test image signal y, i.e., $\hat{y}=(\hat{y}_1, \hat{y}_2, \ldots \hat{y}_n)=\text{DFT}(y)$. Note that although both the target image data x and the test image data y represent pixel values of 2D images, the image data is serialized into 1D vectors $x=(x_1, x_2, \ldots x_n)$ and $y=(y_1, y_2, \ldots y_n)$ for purpose of computing the 1D DFT. Second (step S26B), calculate the frequency domain similarity measure S(x,y) by calculating a dot product of the discrete Fourier transform $\hat{x}$ and the discrete Fourier transform $\hat{y}$, i.e.:

$$S(x, y) = \frac{\Sigma_i \hat{x}_i \hat{y}_i}{\|x\|_2 * \|y\|_2}$$

where $\|x\|_2$ is the norm of x and $\|y\|_2$ is the norm of y.

The frequency domain similarity measure S between the two images x and y is a number between 0 and 1, where 0 means there is no similarity between two image and 1 means that two images are the same. In embodiments of the present invention, if the frequency domain similarity measure S is greater than a predetermined threshold, the object is deemed to be re-identified in the image y, otherwise it is not re-identified (step S26C).

Since the size of the target image x is typically smaller than the size of the entire frame of image taken by the camera 10, in step S26, a sliding window method is used on the image frame to compare the target image x with each patch y of the image frame.

The calculation of the frequency domain similarity measure S described above is simpler and faster than the calculation of the spatial domain correlation r(x,y) described earlier, because fewer multiplications are needed.

As mentioned earlier, the dedicated data processing circuitry 12 in each camera implements the spatial frequency domain similarity analysis algorithm of step S26. Because the algorithm is relatively simple and fast, the processing circuitry 12 can process the stream of video image data as the image data is captured by the camera 10, and re-identify the target object in real time.

Figure 1A:
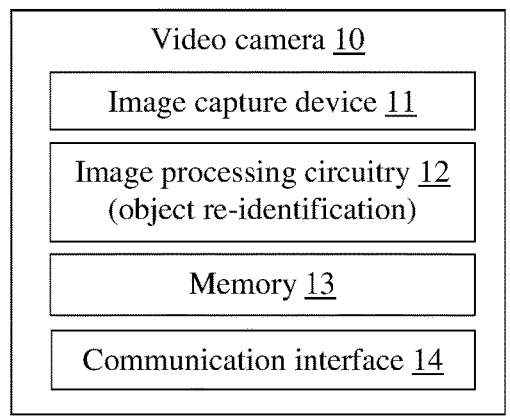

An advantage of the edge computing based system architecture shown in FIG. 1, where smart cameras with edge computing capable for object re-identification are networked without central and cloud computing, is that central and cloud computing can be totally eliminated and the system is very secure. The system can be scaled up without a central computer system.

Figure 3:
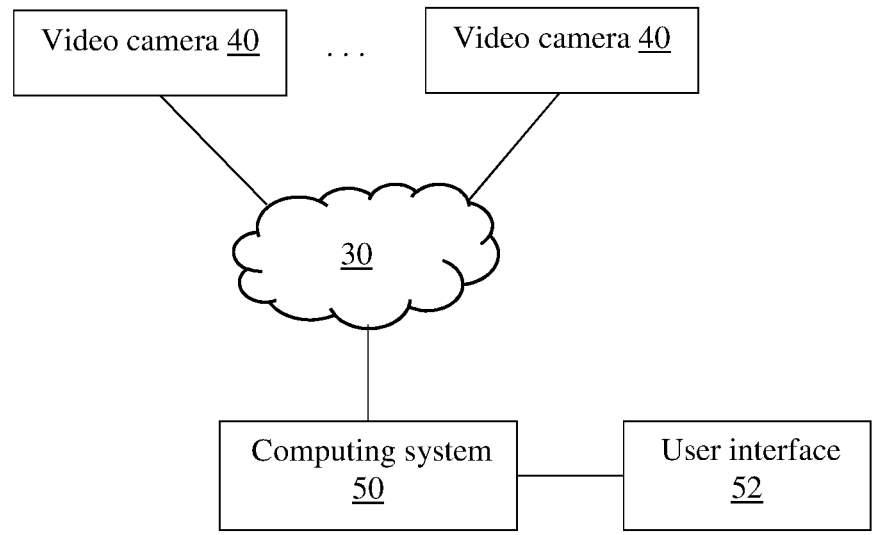
FIG. 3 schematically illustrates an alternative video surveillance system including a plurality of cameras in a cloud based system for object re-identification according to an embodiment of the present invention.
Figure 4:
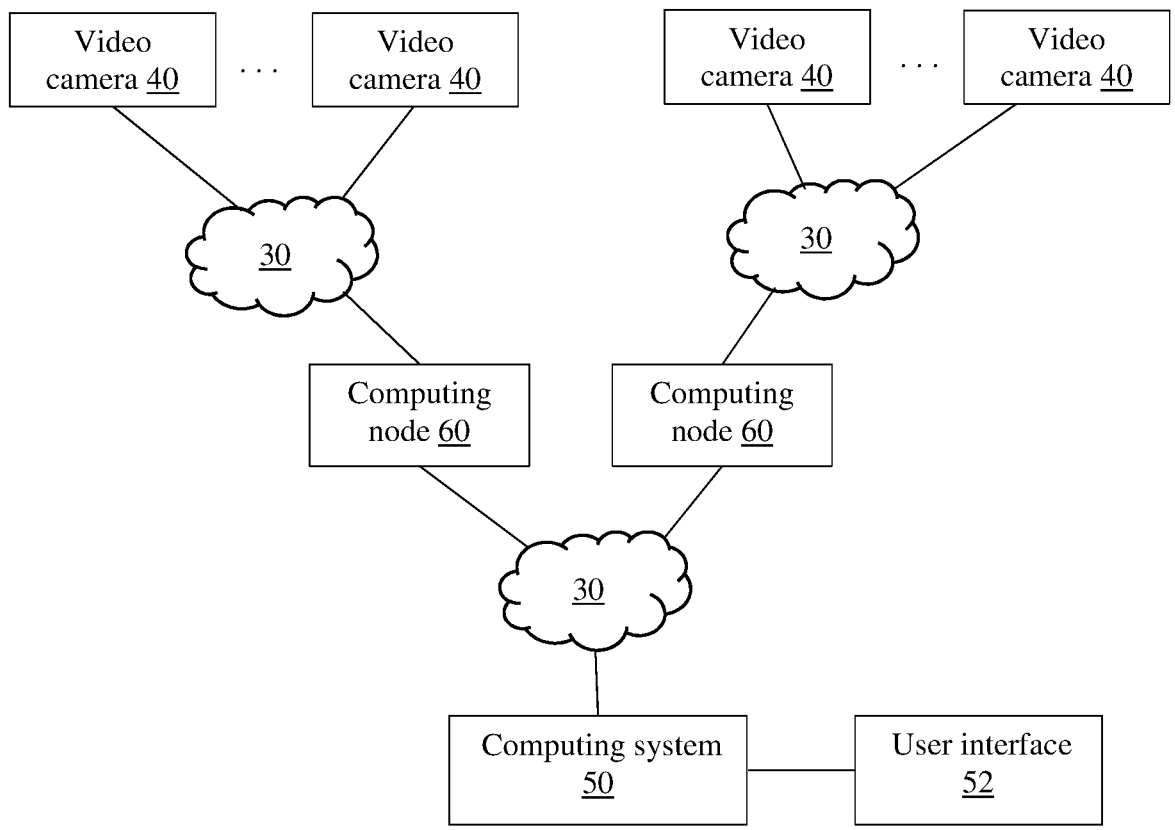
FIG. 4 schematically illustrates an alternative video surveillance system including a plurality of cameras in a distributed computing based system for object re-identification according to an embodiment of the present invention.

In alternative embodiments, the video surveillance system may use a cloud-based central system as shown in FIG. 3, or a distributed system with node computing as shown in FIG. 4. In the cloud-based system configuration (FIG. 3), conventional non-smart cameras 40 are used, and all data collection and analytics including object re-identification are conducted by a computing system 50 which is connected to the cameras via a network 30. Using user interface devices 52 connected to the computing system, an operator can monitor the video images and control the computing system 50 to carry out the object re-identification algorithm. The cameras 40 may have certain image pre-processing capabilities but does not perform the computation for object re-identification. Advantage of this configuration is utilization of the conventional low cost camera with a simple addition of cloud computing. Disadvantages of the configuration include the need to transmit high volumes of video data stream to the computing devices in the cloud, and the heavy demand on the computing capacity of the computing devices in the cloud.

In the distributed computing system configuration (FIG. 4), node computing conducts data analytics from a certain number of cameras (or other dedicated computing nodes) 60, each computing node being connected to a number of conventional non-smart cameras 40 by networks 30. A central computer 50 is connected to the multiple computing nodes 60 by a network, and the operator uses the user interface 52 of the central computer 50 to monitor the images from the multiple cameras received via the computing nodes 60 and identify target objects. Each computing node 60 conducts data analytics including object re-identification for images captured by the cameras 40 connected to that node. Advantages of this configuration include reduced data and computational load at the central computer 50 and local re-identification using node computing with utilization of the conventional cameras.

It will be apparent to those skilled in the art that various modification and variations can be made in the video surveillance system and related method of the present invention without departing from the spirit or scope of the invention. Thus, it is intended that the present invention cover modifications and variations that come within the scope of the appended claims and their equivalents.

What is claimed is:

1. A video surveillance system comprising:
a plurality of video cameras located at different physical locations, each video camera comprising:
an image capture device;
dedicated image data processing circuitry;
a memory; and
a communication interface device;
a monitoring device connected to the plurality of video cameras via a communication network;
wherein each video camera is configured to transmit image data captured by the image capture device of the video camera to the monitoring device via the communication interface device of the video camera,
wherein the dedicated image data processing circuitry of each video camera is configured to perform an object re-identification process which includes:
receiving, from the monitoring device via the communication interface device, target image data x representing an image containing a target object, wherein the target image data is image data that has been transmitted to the monitoring device from another one of the plurality of video cameras;
obtaining test image data y from a frame of image captured by the image capture device of the video camera;
computing a one-dimensional discrete Fourier transform $\hat{x}$ of the target image data x;
computing a one-dimensional discrete Fourier transform $\hat{y}$ of the test image data y;
computing a spatial frequency domain similarity measure S between the target image data x and the test image data y which is proportional to a dot product of the discrete Fourier transform $\hat{x}$ of the target image data x and the discrete Fourier transform $\hat{y}$ of the test image data y;
when the spatial frequency domain similarity measure S is greater than a predetermined threshold value, determining that the target object has been re-identified; and
when the object is re-identified, transmitting, via the communication interface device, an object re-identification result to the monitoring device.

2. The system of claim 1, wherein each video camera is further configured to transmit the object re-identification result to all other video cameras.

3. The system of claim 1, wherein the dedicated image data processing circuitry includes an FPGA (field programmable gate array) or ASIC (application specific integrated circuit) circuitry.

4. A method implemented in a video surveillance system, comprising:
capturing video image data by each of a plurality of video cameras located at different physical locations;
transmitting the video image data from each video camera to a monitoring device;
at the monitoring device, monitoring the video image data to identify a target object in the video image data from one of the video cameras;
generating target image data x representing an image containing the target object using the monitoring device;

transmitting the target image data x from the monitoring device to each of the plurality of video cameras;
each of the video cameras, using its dedicated image data processing circuitry, performing an object re-identification process which includes:
continuing to capture video images;
obtaining test image data y from a frame of captured video image;
computing a one-dimensional discrete Fourier transform $\hat{x}$ of the target image data x;
computing a one-dimensional discrete Fourier transform $\hat{y}$ of the test image data y;
computing a spatial frequency domain similarity measure S between the target image data x and the test image data y which is proportional to a dot product of the discrete Fourier transform $\hat{x}$ of the target image data x and the discrete Fourier transform $\hat{y}$ of the test image data y;
when the spatial frequency domain similarity measure S is greater than a predetermined threshold value, determining that the target object has been re-identified; and
when the object is re-identified, transmitting an object re-identification result to the monitoring device.

5. The method of claim 4, wherein the step of obtaining test image data y from a frame of captured video image includes using a sliding window on the image frame to obtain a plurality of test image data y, and wherein the object re-identification process further comprises:
computing a one-dimensional discrete Fourier transform $\hat{y}$ of each of the test image data y;
computing a plurality of spatial frequency domain similarity measures S between the target image data x and the corresponding plurality of test image data y, each spatial frequency domain similarity measures S being proportional to a dot product of the discrete Fourier transform $\hat{x}$ of the target image data x and the discrete Fourier transform $\hat{y}$ of the corresponding test image data y; and
determining whether each of the spatial frequency domain similarity measure S is greater than a predetermined threshold value.

6. The method of claim 5, wherein the object re-identification process is performed in real time as capture of the video images.

7. The method of claim 4, further comprising, by each of the video cameras:
when the object is re-identified, transmitting the object re-identification result to at least some other ones of the plurality of video cameras.

8. The method of claim 7, wherein each of the video cameras that have received the object re-identification result from another video camera performs the object re-identification process based on the received object re-identification result.

* * * * *